(12) United States Patent
Xia et al.

(10) Patent No.: US 9,460,540 B2
(45) Date of Patent: Oct. 4, 2016

(54) METHOD FOR ANIMATING CHARACTERS, WITH COLLISION AVOIDANCE BASED ON TRACING INFORMATION

(75) Inventors: Zhijin Xia, Beijing (CN); Jun Teng, Beijing (CN); Kangying Cai, Beijing (CN); Zhibo Chen, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 346 days.

(21) Appl. No.: 13/988,338

(22) PCT Filed: Nov. 28, 2011

(86) PCT No.: PCT/CN2011/083077
§ 371 (c)(1),
(2), (4) Date: May 19, 2013

(87) PCT Pub. No.: WO2012/069022
PCT Pub. Date: May 31, 2012

(65) Prior Publication Data
US 2013/0235047 A1 Sep. 12, 2013

(30) Foreign Application Priority Data
Nov. 26, 2010 (WO) ................ PCT/CN2010/001899

(51) Int. Cl.
*G06T 13/80* (2011.01)
*G06T 13/40* (2011.01)
(52) U.S. Cl.
CPC .............. *G06T 13/80* (2013.01); *G06T 13/40* (2013.01); *G06T 2210/21* (2013.01)
(58) Field of Classification Search
None
See application file for complete search history.

(56) References Cited

U.S. PATENT DOCUMENTS

| 5,675,720 | A | * | 10/1997 | Sato et al. | 345/419 |
|---|---|---|---|---|---|
| 7,457,733 | B2 | | 11/2008 | Maille et al. | |
| 7,663,629 | B2 | * | 2/2010 | Ajioka et al. | 345/473 |
| 8,200,594 | B1 | * | 6/2012 | Bleiweiss | 706/45 |
| 8,223,155 | B2 | * | 7/2012 | Cohen et al. | 345/474 |
| 2006/0098014 | A1 | | 5/2006 | Baek et al. | |
| 2008/0033649 | A1 | | 2/2008 | Hasegawa et al. | |
| 2009/0306946 | A1 | | 12/2009 | Badler et al. | |
| 2010/0141666 | A1 | * | 6/2010 | Christopher et al. | 345/520 |
| 2011/0304633 | A1 | * | 12/2011 | Beardsley et al. | 345/474 |

FOREIGN PATENT DOCUMENTS

| CN | 101373542 | 2/2009 |
|---|---|---|
| CN | 101719285 | 6/2010 |

(Continued)

OTHER PUBLICATIONS

Kirchner et al., "Friction effects and clogging in a cellular automaton model for pedestrian dynamics", May 23, 2003, American Physical Society, vol. 67, No. 5, pp. 056122-1:10.*

(Continued)

*Primary Examiner* — Jacinta M Crawford
*Assistant Examiner* — Jonathan M Cofino
(74) *Attorney, Agent, or Firm* — Myers Wolin LLC

(57) ABSTRACT

A method for determining a moving direction or moving velocity for a character in a group comprises reading tracing information from a cell in a terrain map on which the character is located, determining if collision avoidance is needed, and if a collision avoiding maneuver is necessary then updating the tracing information in the current terrain cell.

18 Claims, 3 Drawing Sheets

(56) References Cited

FOREIGN PATENT DOCUMENTS

| CN | 101739509 | 6/2010 |
| CN | 101877132 | 11/2010 |
| JP | 5233591 | 9/1993 |
| JP | 2005182759 | 7/2005 |
| JP | 2005432360 | 12/2005 |
| JP | 2008119211 | 5/2006 |

OTHER PUBLICATIONS

Klüpfel, "A cellular automaton model for crowd movement and egress simulation", Jul. 2003, University of Duisburg-Essen.*

Reynolds, "Flocks, Herds, and Schools: A Distributed Behavioral Model", Jul. 1987, Association for Computing Machinery Siggraph Computer Graphics, vol. 21, No. 4, pp. 25-34.*

Search Report Dated Mar. 8, 2012.

Tecchia et al., "Real-time rendering of densely populated urban environments", IEEE Int. Conf. on Robotics and Automation, 2008, pp. 1928-1935.

Van Den Berg et al., "Reciprocal Velocity Obstacles for real-time multi-agent navigation", IEEE International Conference on Robotics and Automation 2008, Pasadena, CA, May 19-23, 2008, pp. 1928-1935.

Guy et al., "PLEdestrians: A least-effort approach to crowd simulation", Eurographics/ ACM SIGGRAPH Symposium on Computer Animation, 2010, pp. 1-11.

Musse et al., "A model of human crowd behavior: Group inter-relationship and collision detection analysis", Proc. of Eurographics Workshop on Computer Animation and Simulation 1997, Springer Verlag, Budapest, 1997, pp. 39-51.

Reynolds C, "Steering behaviors for autonomous characters", Game Developers Conference, Miller Freeman Game Group, 1999, pp. 1-21.

Treuille et al., "Continuum crowds", ACM Siggraph 2006, pp. 1-9.

Koh et al., "An Extensible collision avoidance model for realistic self-driven autonomous agents", 11th IEEE International Symposium on Distributed Simulation and Real-Time Applications, Jul. 14, 2007, pp. 7-14.

* cited by examiner

METHOD FOR ANIMATING CHARACTERS, WITH COLLISION AVOIDANCE BASED ON TRACING INFORMATION

This application claims the benefit, under 35 U.S.C. §365 of International Application PCT/CN2011/083077, filed Nov. 28, 2011, which was published in accordance with PCT Article 21(2) on May 31, 2012 in English and which claims the benefit of International patent application No. PCT/CN2010/001899, filed Nov. 26, 2010.

This invention relates to a method for animating characters, and in particular for animating large groups of characters, also called crowds.

BACKGROUND OF THE INVENTION

Crowd simulation is widely used in games, movies, urban planning and emergency evacuation simulation. A group of characters, or crowd, is a collection of people/characters that stick together, have the same goal and behave similarly. Group behaviour is very common in our daily life and has been widely studied. If there is strong grouping behaviour in a crowd, it is known to simulate it by first planning the path for each group as a whole, and then planning the activities of each character within the group. One of the most important aspects in crowd simulation is collision avoiding, especially among virtual characters (avatars). In order to make the characters look natural, each character should behave individually, and particularly it should move on its own way in a given terrain. The terrain is represented by a terrain map or roadmap. One problem is that the simulation complexity is high, since each character inside the group undergoes an evaluation of its individual position and situation, for example the "potential field" manoeuvre: each character inside the group moves according to its individual position and environment. In the "potential field" manoeuvre, each character's position and environment is evaluated from scratch for deciding the next step.

Usually, complex calculation on velocity adjustment is performed, as e.g. in "Reciprocal velocity obstacles for real-time multi-agent navigation", J. van den Berg, M. Lin, D. Manocha, IEEE International Conference on Robotics and Automation, 2008.

SUMMARY OF THE INVENTION

According to the present invention, information about at least the computed new velocity will then be stored in cells of the terrain map or roadmap, and it will influence at least the next character that enters the cell. Preferably, the roadmap influences individual behaviour of at least the next character, not the group behaviour in general. Other than in a known technique of grid searching, the information is not related to fixed terrain obstacles, as used for path planning. Instead, the information stored in the terrain map is only an intermediate result, and it is used as a guideline for deciding based on current circumstances for at least the next character.

In one aspect, the invention deals with how to size the grid cells, how to use it for collision avoiding, how to organize tracing information, and how to judge the effectiveness of the information.

In one embodiment of the invention, a device for determining for a character in a group at least one of a moving direction and a moving velocity, comprising a memory for storing cells of a terrain map, first data read means for reading tracing information from a current cell in a terrain map on which the character is located, a first collision detector for determining, based on the tracing information from the first data read means, whether or not collision avoidance is needed, and for notifying the determining result, a first position calculator for advancing the character according to its previous direction and previous velocity if the first calculator notifies that collision avoidance is not needed, a first processor for searching, if the first calculator notifies that collision avoidance is needed, for at least one of a matching direction and velocity, a second processor for computing a time-to-collision based on the found matching direction and/or velocity, a comparator for comparing the computed time-to-collision with a predetermined range, and a second position calculator for advancing the character according to the found matching direction and/or velocity, and for performing a collision avoiding manoeuvre and updating the tracing information in the current terrain cell if no matching direction and/or velocity is found, or if the time-to-collision is outside the predetermined range.

For example, a given terrain is cut into cells of a determined size. The size is determined according to various parameters, e.g. typical velocity (see below). For a character that enters a terrain cell, the entry direction is determined (e.g. one of north N, east E, south S, west W, or one of north N, north-east NE, east E, south-east SE etc.), and it is determined what the direction and/or velocity decision was for previous characters that entered from the same direction. Then it may be checked if certain preconditions that led to the decision are still valid.

Reciprocal Velocity Obstacle (RVO) as described in "Real-time rendering of densely populated urban environments", F. Tecchia, Y. Chrysanthou, Proceedings of the Eurographics Workshop on Rendering Techniques, 2000, is a new technique dealing with collision avoidance. In the case of a two-character scenario, there is an RVO area (or range) for each of the characters on the velocity plane which indicates the velocities that the characters ought not to choose, so that collisions can be prevented. If a character chooses any velocity out of the RVO area, it is guaranteed to avoid the collision with the other character. The RVO technique also assumes that each of the characters adopts the same strategy to avoid collision. In other words, the characters share the responsibility and take action accordingly to avoid any collision.

BRIEF DESCRIPTION OF THE DRAWINGS

Exemplary embodiments of the invention are described with reference to the accompanying drawings, which show in FIG. 1 a multi-character scenario Reciprocal Velocity Obstacle.

DETAILED DESCRIPTION OF THE INVENTION

Figure 1:
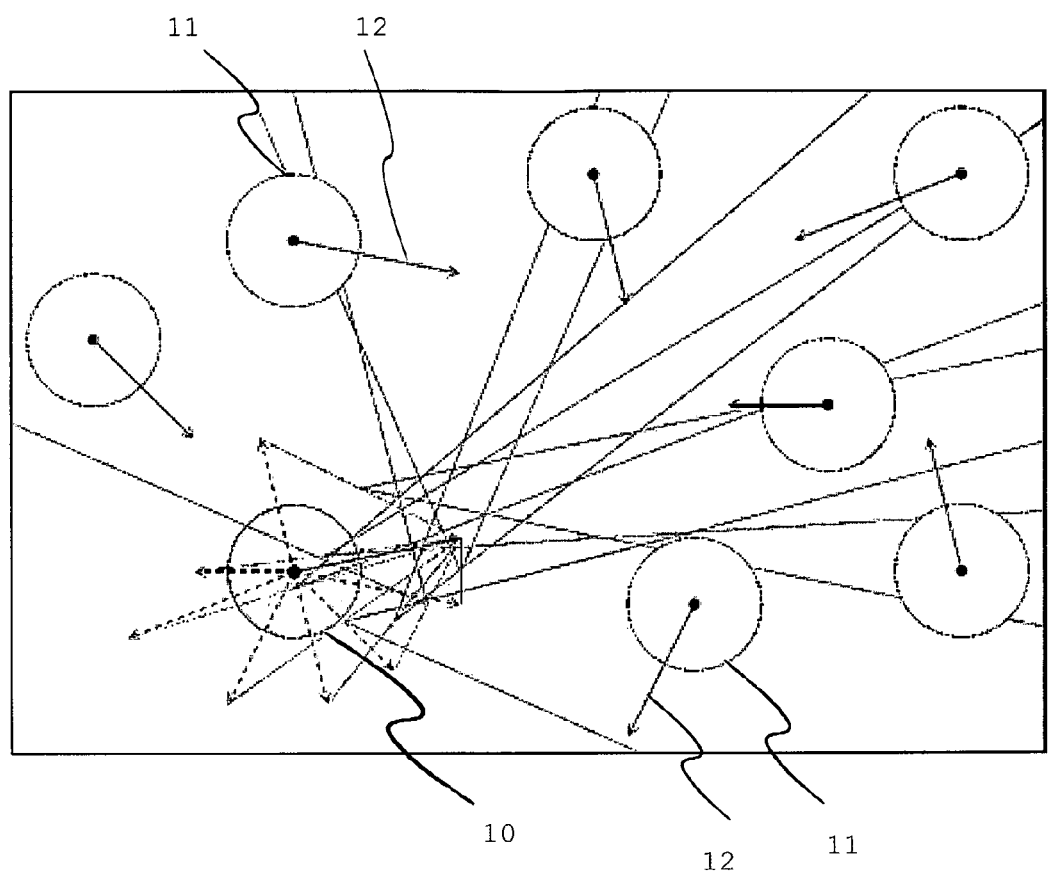

FIG. 1 shows a multi-character scenario RVO. In FIG. 1, one character 10 should choose a velocity which lies out of the combination of the RVOs of all the neighbouring characters. The neighbouring characters 11 have individual moving directions and speeds 12. However, in a very crowded situation, this velocity may not exist. Thus, for proceeding with the simulation, we still have to choose a velocity for the character. Therefore we choose the velocity with the least "penalty". A typical penalty function for character i is:

$$penalty_i(v_i') = w_i \frac{1}{tc_i(v_i')} + \|v_i^{pref} - v_i'\| \quad (1)$$

In eq. (1), $V_i'$ is the new velocity; $V_i^{pref}$ is the preference velocity; $tc_i(V_i')$ is the estimated time to collision; $w_i$ is the weight to balance between time to collision and velocity diversion. $\|\ldots\|$ designates a distance.

This technique shows good performance in practice, but the computation complexity is so high that it is impossible to simulate crowds with large numbers of characters. For every time step, for each character, the simulator need to sample hundreds of admissible velocities, and compute the penalty for each velocity to find out the velocity with the least penalty (hereafter, this process is called "RVO velocity selection"). Therefore, it is of high importance to large crowd simulation, especially for real-time applications, how to reduce the complexity of "velocity selection".

In the following, a novel velocity selection method is proposed. Compared with the "RVO velocity selection" process, the below described method significantly reduces the total complexity of the crowd simulation.

The proposed method reduces the complexity of crowd simulation by using the tracing information of previous characters to select the new velocity for the target character. First, the plane (e.g. a 2D plane), on which the characters walk, is discretized into a regular grid. The resolution of the grid is determined by the preference velocity and simulation time step. The tracing information, including the entry angle, the new velocity and the time to collide, is stored in each cell of the grid. When entering a new cell, the following character searches for the tracing information which matches its entry angle (i.e. that has substantially the same entry angle), and then computes the time to collide based on the new velocity. If the time to collide for the current character is comparable with that stored in the cell (at least if both are equal), the character selects the new velocity without doing a new round of RVO-style collision avoiding computation; otherwise, a traditional RVO collision avoiding is conducted, and the tracing information in the cell is renewed accordingly.

Figure 2:
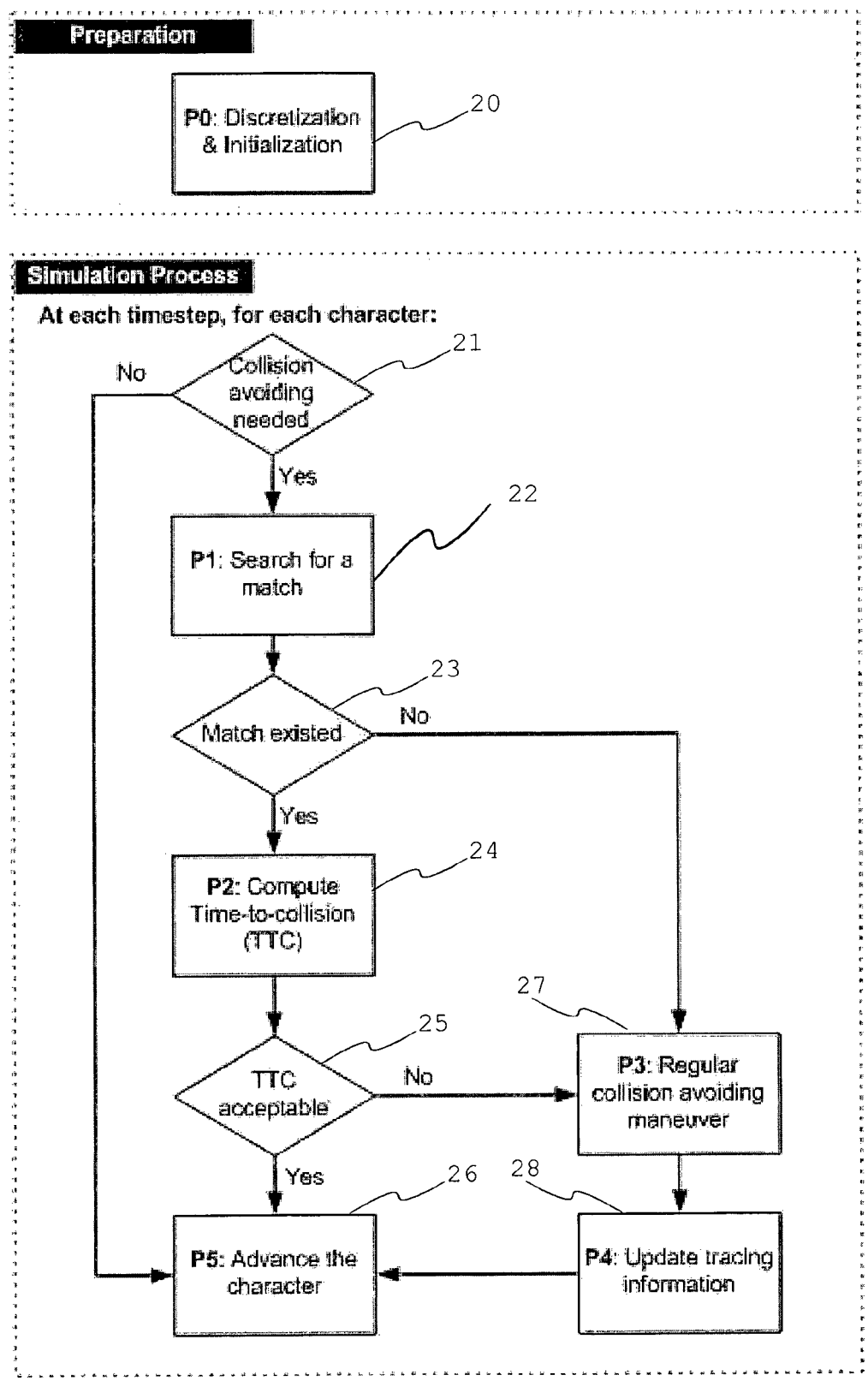
FIG. 2 steps of a simulation method.

FIG. 2 shows the steps of the proposed simulation framework. Detailed explanation for each step is given below.

Figure 3:
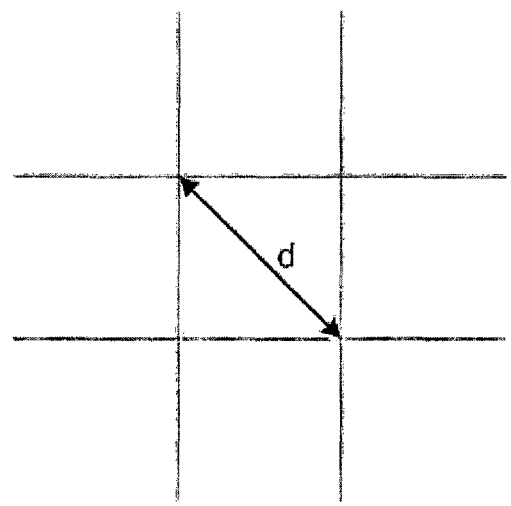
FIG. 3 a portion of a terrain grid.

In a preparation phase 20, discretization and initiation are performed P0. Before the simulation, the terrain is discretized into a regular grid of cells (this could be easily applied to a 3D terrain surface, but here we use a 2D plane for simplicity). FIG. 3 shows a portion of a terrain grid with a diameter d, which is called resolution. The resolution of the grid is determined by the principle that for each time step, the character should walk with preference speed to a new cell. Therefore, $$d < \Delta t * V^{pref} \quad (2)$$

in which d is the diagonal of the grid cell (referring to FIG. 3), $\Delta t$ is the length of the time step, and $V^{pref}$ is a preference speed. In one embodiment, we assume for simplicity that it is identical for all the characters.

Figure 4:
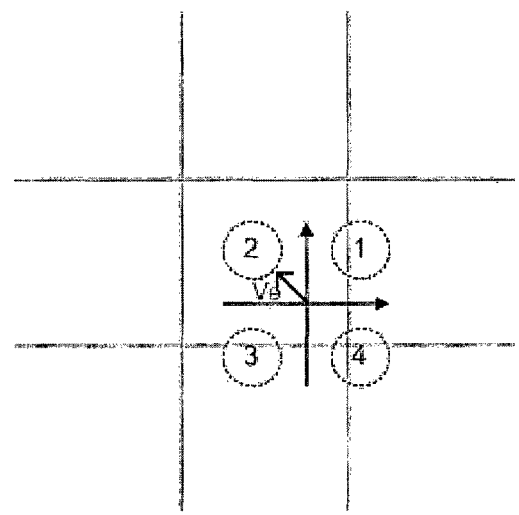
FIG. 4 a grid portion and tracing information.

FIG. 4 shows a grid portion and tracing information. The tracing information stored in a grid cell includes at least four sets of data, each of which relates to a range of entry direction Ve of the character. In each data set, the new velocity $V_{new}$ and the time-to-collide (TTC) based on this new velocity are included and presented.

In a second phase shown in FIG. 2, a simulation process is performed. If collision avoiding is needed, a first module P1 performs searching for a match in a search step 22. That is, whenever it is determined 21 that the collision avoiding manoeuvre is needed, we search 22 the cell being occupied by the character for determining 23 if tracing information exists that matches the entry direction of this character. If the tracing information does not exist, a regular collision avoiding manoeuvre is conducted 27, which is known and usually highly complex.

In a next step 24, a second module P2 computes a time-to-collision (TTC). Supposing the character takes the new velocity from the tracing information, it is still possible that the character collides with others. TTC is the time it takes for the first collision to happen. If it is determined 25 that no collision will happen, TTC is sufficiently large. This computed TTC should be subjected to $$TTC^{computed} > \max(TTC^{tracing} k * \Delta t, \Delta t) \quad (3)$$

wherein $TTC^{tracing}$ is the tracing information stored in the cell. Otherwise the match fails and a regular collision avoiding manoeuvre will be conducted 27. The constant k indicates a number of simulation time steps and should be chosen properly to indicate a tolerance of mismatch. The smaller it is, the more rigid the match is. There is a trade-off between the rigidity of the match and the success possibility of the match. In addition, if k is overlarge, the matching tracing information could be of little guidance to a current character, and hence leads to bad new velocity which could make the collision avoiding less efficient. The actual value of k depends strongly on the given length of simulation time steps $\Delta t$, i.e. temporal resolution of the simulation.

A third module P3 performs 27 a regular collision avoiding manoeuvre. If no tracing information exists in a cell, or if available tracing information does not match well, the regular collision avoiding maneuver will be conducted in order to select a new velocity for the current character. One suggestion is using the known RVO collision avoiding technique to deal with the velocity selecting problem, as in the above-mentioned reference "Reciprocal velocity obstacles for real-time multi-agent navigation".

A fourth module P4 updates 28 the tracing information in the terrain cell. Whenever the regular collision avoiding manoeuvre is conducted, the corresponding tracing information stored in the cell has to be updated.

A fifth module P5 advances 26 the character. Based on the new velocity, the new position is computed for the character, e.g. by using Newtonian mechanics (i.e. a new position is calculated according to s=v*t, with s the distance, v the velocity and t the time). The new position is stored, either in the terrain map or in a separate memory.

Figure 5:
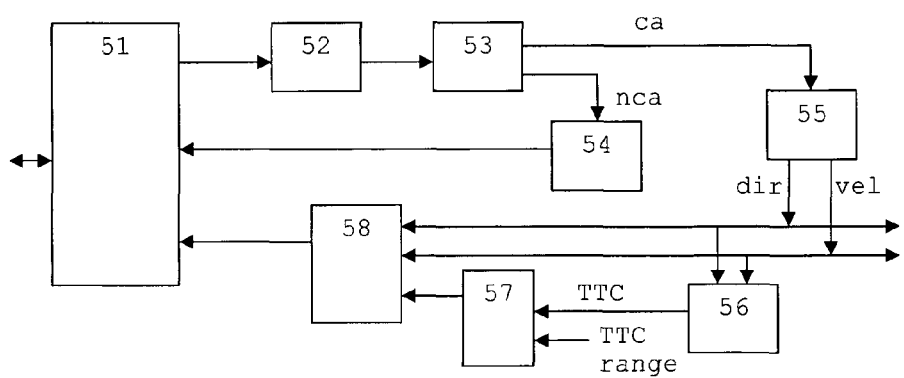
FIG. 5 a block diagram of a device for determining at least one of a moving direction and a moving velocity for a character in a group.

In one embodiment, the invention concerns a device for determining at least one of a moving direction and a moving velocity for a character in a group. FIG. 5 shows a block diagram of such device. The device for determining for a character in a group at least one of a moving direction and a moving velocity comprises a memory 51 for storing cells of a terrain map, first data read means 52 (e.g. memory accessing unit) for reading tracing information from a current cell in a terrain map on which the character is located, a first collision detector 53 for determining, based on the tracing information from the first data read means, whether or not collision avoidance is needed, and for notifying ca,nca the determining result, a first position calculator 54 for advancing the character according to its previous direction and previous velocity if the first calculator notifies that collision avoidance is not needed nca, a first processor 55 for searching, if the first calculator notifies that collision avoidance is needed, for at least one of a matching direction dir and velocity vel, a second processor 56 for computing a time-to-collision TTC based on the found matching direction and/or velocity, a comparator 57 for comparing the computed time-to-collision TTC with a predetermined range, and a second position calculator 58 for advancing the character according to the found matching direction and/or velocity, and for performing a collision avoiding manoeuvre and updating the tracing information in the current terrain cell if no matching direction and/or velocity is found, or if the time-to-collision is outside the predetermined range.

The invention can be used in different application scenarios. Generally, the method reduces the complexity of crowd simulation, by reducing the times of regular collision avoiding manoeuvres. Tracing information stored in a terrain cell is used as guidance for a current character that has a similar entry direction as another character that was previous on the terrain cell, so that the stored velocity could be used immediately without doing complex computations.

This method is based on the assumption that the characters in a group that follow others will face a situation similar to that of previous characters. This is especially true when two groups of characters cross each other. Thus, the method of the invention can be used to determine motion direction and velocity of individual characters in groups that interfere with each other, such as a group crossing another group's way or a group encountering another group. The method can be used in any crowd simulation, e.g. fighting scene in movies, traffic simulation, evacuation simulation, etc., as long as the assumption mentioned above is justified.

The proposed method is an effective way to simulating very large crowd (thousands of characters, or more). There are several input parameters that control the behaviour of a simulated crowd. One is d (i.e. the indicator of resolution of the grid), which determines the smoothness of the motion; another is k in the TTC formula, which determines the tolerance of mismatch. E.g. in simulation software that uses the invention, these parameters can be programmable. The invention leads to obvious "following" patterns within terrain grid cells, since following characters use tracing information from previous characters. That is, characters following each other will typically take the same way, but take current situations (e.g. moving obstacles) into account, which is similar to realistic human crowd behaviour.

The present invention is usable for simulating a crowd e.g. by first planning the path and velocity for each group and then adjusting the velocity for each character inside the group. Steps are
1. Global planning and local collision avoiding for the groups; each group is treated as a single entity (i.e. a group heading direction is determined for each group).
2. Adjust the velocity of each character in the group whenever the group heading direction changes.
3. Combine the velocity for the group and the local adjustment to generate the new velocity for each character. For characters following others, it is not necessarily required to do the complete calculation again. Instead, the information about the computed new position will be stored in cells of the terrain map. The method reduces the complexity of crowd simulation, and can be used in film or game production, especially when simulating the behaviour of a coherent group of characters, such as an army.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention.

Each feature disclosed in the description and (where appropriate) the claims and drawings may be provided independently or in any appropriate combination.

Reference numerals appearing in the claims are by way of illustration only and shall have no limiting effect on the scope of the claims.

REFERENCES

"Reciprocal velocity obstacles for real-time multi-agent navigation", J. van den Berg, M. Lin, D. Manocha, IEEE International Conference on Robotics and Automation, 2008
"Real-time rendering of densely populated urban environments", F. Tecchia, Y. Chrysanthou, Proceedings of the Eurographics Workshop on Rendering Techniques, 2000

The invention claimed is:

1. A method to avoid collision, the method comprising:
reading tracing information stored in a current cell of a terrain map in which a character is located, the tracing information comprising an entry angle of the character in the current cell;
advancing the character in accordance with a previous entry angle and a previous velocity of the character, when collision avoidance is not needed;
searching the current cell for at least one other character whose entry angle and velocity indicates a potential collision between the character and the at least one other character;
if the potential collision is indicated, computing a time-to-collision;
if the time-to-collision is outside a predetermined range, calculate a new velocity for the character using a reciprocal velocity obstacle operation; and
if the time-to-collision is within the predetermined range, calculate the new velocity for the character using an operation of a type different from the reciprocal velocity obstacle operation.

2. The method according to claim 1, wherein a cell of the terrain map has a diameter d according to $d < \Delta t * V^{pref}$, wherein $\Delta t$ is a simulation time step and $V^{pref}$ is a given preference speed of characters.

3. The method according to claim 1, further comprising setting a preference speed for each character in the terrain map.

4. The method according to claim 1, influencing an individual behavior of at least a next character entering the cell based on the tracing information.

5. The method according to claim 1, further comprising searching the tracing information for a range of entry angles including the entry angle of the character, in order to determine whether collision avoidance is needed.

6. The method according to claim 1, wherein tracing information of a cell in the terrain map comprises an entry angle, a new velocity and a time-to-collision of at least one previous character that entered the cell.

7. The method according to claim 1, wherein the tracing information of a cell comprises at least four sets of data, each of which relates to a range of entry angles $V_e$ of the character, and each data set comprises at least a new velocity $V_{new}$ and a time-to-collision based on this new velocity.

8. The method according to claim 1, wherein the information stored in the terrain map is an intermediate result that is used as a guideline for deciding at least one of speed and velocity for at least a next character based on current circumstances.

9. The method according to claim 1, further comprising:
determining a direction for a group of characters;
adjusting a speed for each character inside the group when the direction changes; and
combining the velocity for the group and a local adjustment to generate a new velocity for each character so as to simulate a crowd.

10. A device to avoid collision, the device comprising:
a memory for storing cells of a terrain map; and
at least one processor configured to:
read tracing information from a current cell of the terrain map in which a character is located the tracing information comprising an entry angle of the character in the current cell;
advance the character according to a previous entry angle and a previous velocity of the character, when it is determined that collision avoidance is not needed;
search the current cell for at least one other character whose entry angle and velocity indicates a potential collision between the character and the at least one other character;
if the potential collision is indicated, compute a time-to-collision;
if the time-to-collision is outside a predetermined range, calculate a new velocity for the character using a reciprocal velocity obstacle operation; and
if the time-to-collision is within the predetermined range, calculate the new velocity for the character using an operation of a type different from the reciprocal velocity obstacle operation.

11. The device according to claim 10, wherein the tracing information comprises an entry angle, a new velocity and a time-to-collision for at least one previous character that entered the current cell.

12. The device according to claim 10, wherein the tracing information comprises at least four sets of data, each of which relates to a range of entry directions $V_e$ of the character, and each data set comprises at least a new velocity $V_{new}$ and a time-to-collision based on this new velocity.

13. The device according to claim 10, wherein the at least one processor is further configured to search the tracing information for a range of entry angles including the entry angle of the character, in order to determine whether collision avoidance is needed.

14. The device according to claim 10, wherein a cell of the terrain map has a diameter d according to $d<\Delta t*V^{pref}$, wherein $\Delta t$ is a simulation time step and $V^{pref}$ is a given preference speed of characters.

15. The device according to claim 10, wherein the at least one processor is further configured to:
determine a direction for a group pf characters;
adjust a speed for each character inside the group when the direction changes; and
combine the velocity for the group and a local adjustment to generate a new velocity for each character so as to simulate a crowd.

16. The device according to claim 10, further comprising setting a preference speed for each character in the terrain map.

17. The device according to claim 10, wherein the tracing information influences an individual behavior of at least a next character entering the current cell.

18. The device according to claim 10, wherein the information stored in the terrain map is an intermediate result that is used as a guideline for deciding at least one of speed and velocity for at least a next character based on current circumstances.

* * * * *